(12) United States Patent
Kauhanen (10) Patent No.: US 7,667,186 B2
(45) Date of Patent: Feb. 23, 2010

(54) OPTOELECTRONIC POSITION DETERMINATION SYSTEM

(75) Inventor: Petteri Kauhanen, Espoo (FI)

(73) Assignee: Nokia Corporation, Espoo (FI)

( * ) Notice: Subject to any disclaimer, the term of this patent is extended or adjusted under 35 U.S.C. 154(b) by 725 days.

(21) Appl. No.: 11/023,233

(22) Filed: Dec. 27, 2004

(65) Prior Publication Data

US 2005/0263688 A1 Dec. 1, 2005

Related U.S. Application Data

(63) Continuation-in-part of application No. 10/859,158, filed on Jun. 2, 2004.

(60) Provisional application No. 60/575,209, filed on May 28, 2004.

(51) Int. Cl.
*G01D 5/34* (2006.01)
*G06M 7/00* (2006.01)

(52) U.S. Cl. .................... 250/231.13; 250/221

(58) Field of Classification Search ................ 250/231.13–231.18, 221, 201.2; 356/698, 356/614–625

See application file for complete search history.

(56) References Cited

U.S. PATENT DOCUMENTS

| | | | |
|---|---|---|---|
| 5,294,793 A | 3/1994 | Schwaiger et al. | |
| 5,391,866 A | 2/1995 | Hoshino et al. | |
| 5,587,846 A | 12/1996 | Miyano et al. | |
| 5,973,319 A | 10/1999 | Washisu | |
| 6,459,492 B1 | 10/2002 | Hercher | |
| 6,586,719 B1 * | 7/2003 | Bartzke et al. | ............... 250/221 |
| 6,664,535 B1 | 12/2003 | Nahum | |
| 6,822,688 B2 * | 11/2004 | Ohta | ........................ 348/349 |
| 2003/0218125 A1 * | 11/2003 | Igaki et al. | ............. 250/231.13 |
| 2005/0133705 A1 * | 6/2005 | Hare et al. | ............. 250/231.13 |
| 2005/0139756 A1 * | 6/2005 | Brickey et al. | ........... 250/231.1 |
| 2005/0231736 A1 * | 10/2005 | Jeffers et al. | ................ 356/615 |

FOREIGN PATENT DOCUMENTS

| | | |
|---|---|---|
| GB | 2 309 519 | 7/1997 |
| JP | 56130603 | 10/1981 |
| JP | 60218006 | 10/1985 |
| JP | 07146113 | 6/1995 |
| JP | 2001194111 | 7/2001 |
| JP | 2003247864 | 9/2003 |
| WO | WO 03/104874 | 12/2003 |
| WO | WO 03/105459 | 12/2003 |

OTHER PUBLICATIONS

European Search Report for European Application No. EP 05 85 0715.3 dated Feb. 26, 2009.

* cited by examiner

*Primary Examiner*—Georgia Y Epps
*Assistant Examiner*—Pascal M Bui-Pho
(74) *Attorney, Agent, or Firm*—Foley & Lardner, LLP (57) ABSTRACT

A system and method for accurately determining the positioning of a lens system. The lens system includes a lens and a mono-color light reflecting surface. A position sensor includes a light source and a light detector. An initial signal is sent from the light source to the monor-color light reflecting surface. The light reflecting surface reflects the initial signal to the light detector at a reflection region. The intensity of the reflected signal is dependent upon the distance between the reflection region and the position sensor, which is variable. An electrical output signal is generated based upon the reflected signal from the light source, with the electrical output signal providing positioning information for the lens system.

19 Claims, 7 Drawing Sheets

OPTOELECTRONIC POSITION DETERMINATION SYSTEM

CROSS-REFERENCE TO RELATED PATENT APPLICATIONS

This application is a Continuation-in-Part of U.S. application Ser. No. 10/859,158, filed Jun. 2, 2004, which claims priority to U.S. Provisional Patent Application No. 60/575,209, filed May 28, 2004, both of which are, incorporated herein by reference in their entirety.

FIELD OF THE INVENTION

The present invention relates generally to the field of optoelectronical position sensors. More particularly, the present invention relates to optoelectronical position sensors for miniature zoom and autofocus systems.

BACKGROUND OF THE INVENTION

The components of electronic cameras require low power consumption, low weight and cost efficiency. These design criteria are challenged by the demand for optically adjustable cameras that provide autofocus, zoom optics, or both. These features require the relative movement of optical elements to provide the adjustment. The required motion is typically linear but may use a rotating motor combined with a motion-converting mechanism such as a lead-screw. The motion range is often in the order of millimeters.

When a camera has a movable lens or lens group for focusing or zooming, the exact position of the lens(es) needs to be determined in order to adjust correctly the actuator(s) moving the lens(es). This is required, for example, to accomplish automatic focusing. The problems in such a position measurement are related to the required very high accuracy and linearity of the measurement. Requirements for mechanical strength and reliability are also high because of the amount of duty cycles (>100,000) over the lifetime of the product. Generally, when speaking of optics, the accuracy requirement is very high. The tolerance is usually a few microns. In addition to being accurate, the position determination has to be rapid as well. The objective is to correct a defocused image before the user even recognizes it. This means that the lens position determination and the following corrective lens movement has to take typically place in a few hundredth part of a second. Additionally, current consumption always needs to be minimized. Ideally, the position measurement sensor would also be small and compact in size, as well as economical to manufacture.

Figure 1:
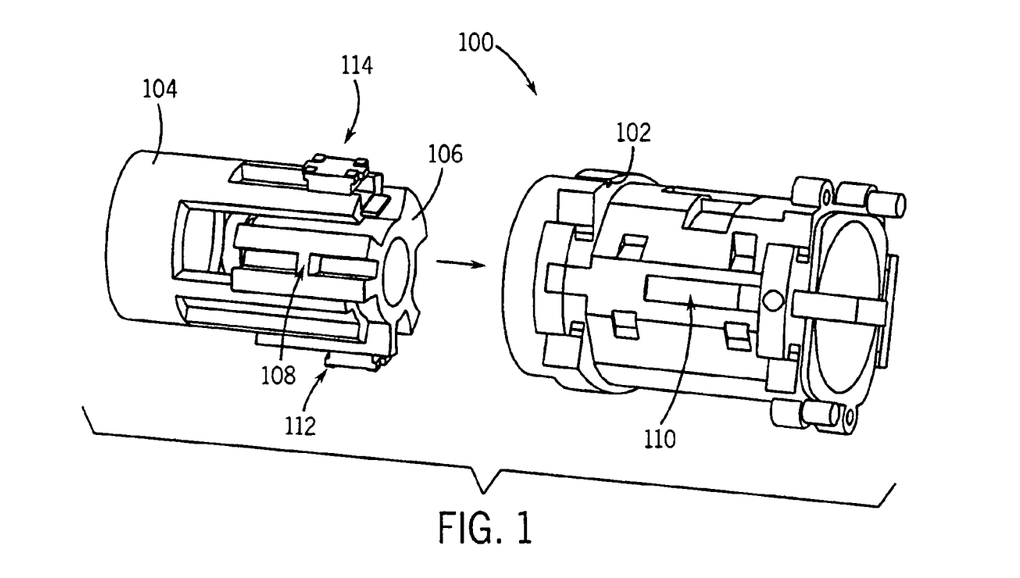
FIG. 1 is a perspective view of a conventional zoom module.

U.S. Pat. No. 6,710,950 and U.S. patent application Ser. No. 10/315,885, both assigned to Nokia Corporation and incorporated herein by reference, are both directed to digital camera systems that incorporate the use of adjustable camera optics. Zoom modules, such as the module shown schematically in FIG. 1, are developing to be increasingly compact. The module shown in FIG. 1, shown generally at 100, includes a support tube 102 and first and second lens tubes 104 and 106. In a zoom module, such as that shown in FIG. 1, there are a pair of lens groups that are arranged to move with respect to each other and with respect to the support tube 102. In FIG. 1, the focusing lens (or lens group) is arranged in the left end of the first lens tube 104. The zoom lens (or lens group) is arranged inside the second lens tube 106. The first and second lens tubes 104, 106 have both their own actuators (not shown). In FIG. 1, for example, the second lens tube 106 is arranged to be actuated via a cantilever 108, which protrudes out through an opening 110 provided in the support tube 102, and connects further to an actuator outside the support tube 102. In contrast, in an autofocus system, only a single actuator and a lens tube or corresponding structure may be required. It should be noted that FIG. 1 shows only one possible arrangement for miniature zoom optics. Other distance measurement techniques are based upon resistance, capacitance and inductance.

The motors/actuators for moving and adjusting the lens tubes 104 and 106 require accurate positioning systems, which face the same strict space limitation problems. These space limitations are particularly noteworthy in digital cameras, and particularly digital cameras incorporated into devices such as mobile telephones. In conventional cameras, the lenses have traditionally been moved through the use of electromagnetic stepper motors, and the position information for lenses is received by counting the number of drive signals that are fed to the motor coils. However, such systems, particularly systems including stepper motors do not have a sufficient level of accuracy for use in digital cameras.

In FIG. 1, separate position sensors for the first lens tube 104 and the second lens tube 106 are depicted schematically with reference numerals 112 and 114, respectively. From the above, it is clear that there is a real need for small sized and high precision position sensors in these type of applications. Price is also a very critical point for a position sensor in mass produced products, and at the same time the system should meet the high accuracy requirement that camera optics set. This is particularly important as such cameras are incorporated into smaller and smaller devices, such as portable electronic telephones.

Prior art lens position sensors based on magneto-resistive sensors are disclosed in U.S. Pat. Nos. 5,859,733 and 5,587,846. Additionally, Hall-effect elements are known to be used for similar purpose. One such device is discussed in U.S. Pat. No. 5,587,846. U.S. Pat. No. 5,391,866 discloses an optical lens position sensor which is based on the use of a photo emitter arranged behind a slit and arranged to further illuminate a position sensitive photodetector. However, there is still clear need for small sized and economical position sensors having high accuracy. In particular, non-contacting type optical sensors have not been widely and effectively applied to these kinds of applications.

SUMMARY OF THE INVENTION

The present invention relates to a positioning system based on a light source and a light sensor together with a scale including a varying level of reflectance, such as a light reflecting greyscale, a bar code scale, or wedge-shaped black-and-white patterns. In all cases, the position determination is based upon changing reflectance, which is measured with a light detector, such as a phototransistor or photodiode. The present invention also involves managing the heat generation of the position sensor by operating a light source such as an light emitting diode (LED) non-continuously and thereby enhancing the accuracy and minimizing the start-up time of the system. The sensor operation is divided into two parts. One part involves measurement with the light source switched on, and the other involves a cooling period with the light source switched off. Due to the latter operation mode, the power feed to the component is compressed to a minimum, thereby avoiding unnecessary heat production.

Additionally, a thermistor or other temperature sensor measures the ambient temperature and delivers this information to position sensing software. This information is used in correcting the offset shift that occurs in sensor output signal when the outer temperature changes, effectively compensating for the variation of ambient temperature.

The present invention also involves the determination of a "sensor signal vs. position" curve for each individual sensor by using a calibrating sensor together with the actual position sensor. The calibrating sensor reads a bar code scale, which provides the information needed for the type curve determination. This enables mass production of the camera modules. Also self-calibration of possible changes of the sensor output curve, caused by long exposure to extreme temperatures or aging, is taken into count. The high variation of quality of low cost light source and light detector modules, for example on/off-type photointerrupters, is therefore effectively managed by using two sensors in the positioning system.

In an additional embodiment of the present invention, a position sensor using a photointerruptor, comprising a light emitting diode and a phototransistor, and a tilted mono-color reflective surface is used for more accurate position sensing than conventional systems. The accuracy achieved using this system is substantially improved over both conventional systems and systems incorporating a greyscale reflector.

These and other objects, advantages, and features of the invention, together with the organization and manner of operation thereof, will become apparent from the following detailed description when taken in conjunction with the accompanying drawings, wherein like elements have like numerals throughout the drawings described below.

BRIEF DESCRIPTION OF THE DRAWINGS

FIG. 4(*a*) is a schematic showing the operation principle of a sensor chip for a positioning system constructed in accordance with the principles of the present invention, and FIG. 4(*b*) is a representation showing the structural arrangement for lens position determination;

FIG. 7(*a*) is a perspective view of a positioning system including a self-calibration mechanism according to the principles of the present invention, and FIG. 7(*b*) is a representation demonstrating the principle of self-calibration according to the present invention;

DETAILED DESCRIPTION OF THE PREFERRED EMBODIMENTS

Figure 2:
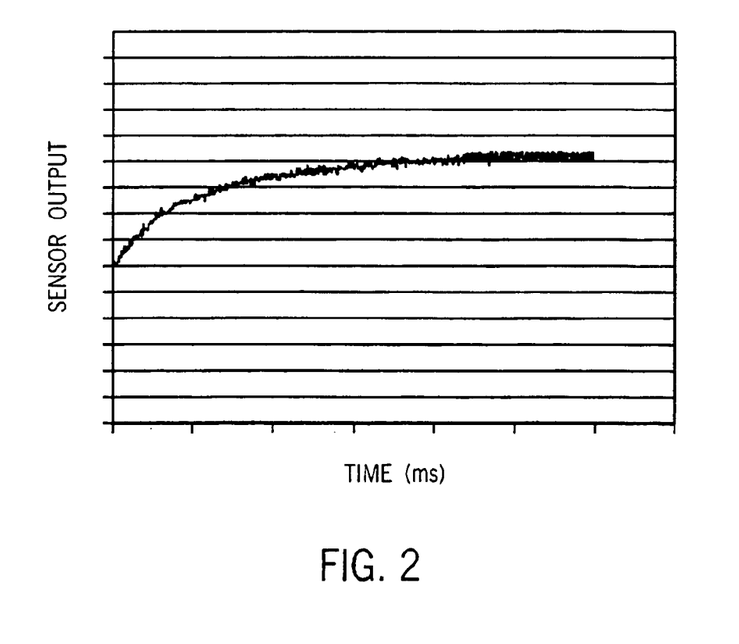
FIG. 2 is a plot showing sensor output voltage vs. time for an on/off-type photointerruptor.

An important aspect of position sensors for high volume products is the cost of the sensor component itself. The present invention uses a light source-light detector combination for determining the amount of light reflected from a reflector target that has locally variable light reflection properties. A cost-effective solution for such light source-light detector components is the use of "photointerrupter components." These components are traditionally used, for example, as low-accuracy proximity sensors. However, the economical price of these components also creates a number of diasadvantages when they are applied beyond their normal purpose of use. As is the case for all devices made of semiconductor materials, photointerrupters are also highly temperature sensitive. Besides the changing ambient temperature, the component's own heat production distorts the output signal. The sensor reading starts to drift when temperature changes and the received position information in this type of applications is false. This phenomena is depicted in FIG. 2. The warm-up period needed for sensor stabilization is often in the magnitude of several minutes, which is very undesirable from a user's point of view in the present type of applications. Ideally, the lens positioning system should be ready for use instantaneously, eliminating the drift phenomenon.

Figure 3:
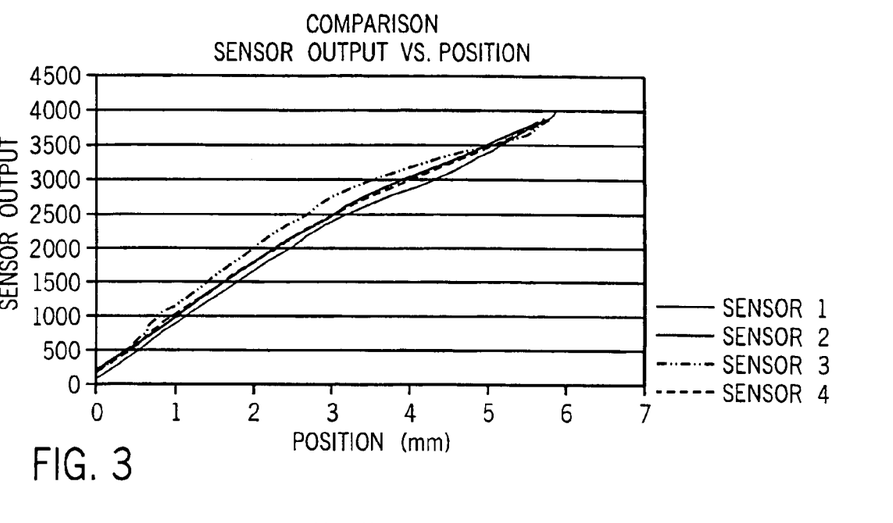
FIG. 3 is a plot comparing sensor output versus position for several different individual sensors.

Additionally, because a photointerrupter component is a low-end product traditionally used in proximity sensors and alike, where the accuracy requirements are much more relaxed compared to the current application, there is unacceptably high variation in performance between different sensor individuals. This results in a high degree of inaccuracy, as the actual sensor output does not correspond to the predetermined pattern that software expects. This is clearly exhibited in FIG. 3, where it is shown that the quality difference between different sensor individuals can lead to a deviation of up to nearly a half of a millimeter when used in the present lens position application. Preferably, the output curve should always be consistent. Furthermore, it is a known fact that aging, i.e. emission power reduction, is a typical phenomenon for LED's. This could also affect the shape of the output curve, again resulting in decreased accuracy.

The present invention is directed to a positioning system as shown and described in more detail in FIGS. 4-10. As represented and shown in FIG. 4(*b*), a lens tube system 10 constructed according to one embodiment of the present invention, comprises an IR photointerrupter 12 (or other suitable light source-light detector module) that includes a light source 14 and a light detector 16. Preferably, the photointerrupter operates in the infrared range, but other wavelength ranges, including the range of visible light, could also be used. It should be noted that a wide variety of light source-light detector modules, including but not limited to those utilizing semiconductor components such as LEDs or laser diodes as emitters, and photodiodes or phototransistors as detectors, could also be used instead of a photointerrupter component. In a preferred embodiment of the present invention, a low-cost semiconductor based photointerrupter module is modified into a position sensor that has an accuracy of 10 μm along a 6 mm long motion range. The lens tube system 10 is operatively connected to a housing for a larger device, preferably a portable electronic device such as a digital camera or a portable telephone with a built-in camera.

Figures 4A, 4B:
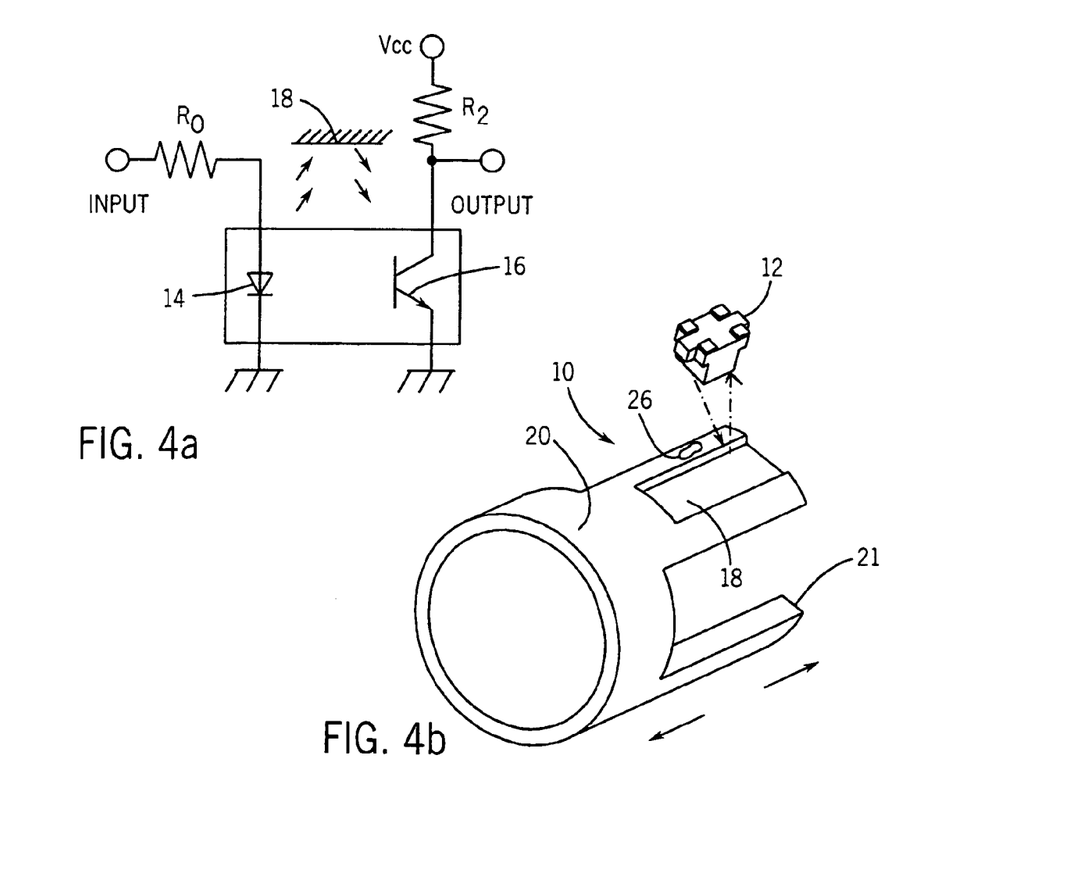

Position determination, according to one embodiment of the present invention, is based on measuring the intensity of the light beam that travels from the light source 14 to a greyscale 18 and reflects back to the light detector 16. The output signal of the position sensor 12 depends on reflectance, which varies with position along the greyscale 18, as shown in FIGS. 4(*a*) and 4(*b*). As a lens tube or other lens frame 20 moves axially, the greyscale 18 moves in relation to the position sensor 12, and the intensity of the reflected light varies correspondingly. The lens frame 20 can be moved by one of several mechanisms known to those in the art, such as those systems described in U.S. Pat. No. 6,710,950 and U.S. patent application Ser. No. 10/315,855, both of which are assigned to Nokia Corporation. However, it should be noted that the present invention is not limited in any way on the choice of the actuators moving the various components. Any suitable actuators or any suitable configuration of the lens tubes or frames may be applied. When the beam reaches the light detector 16, a respective electrical output signal is induced or generated, with the generated output signal being affected by the position on the greyscale 18 (the reflection region) where the light beam is reflected. This process may involve the use of both signal amplification and AD-conversion (i.e., the conversion of an analog signal to a digital signal). AD conversion can be accomplished by a variety of systems and methods known in the art. The digital signal is then fed to a processor (not shown), which controls the drive electronics.

Figure 5:
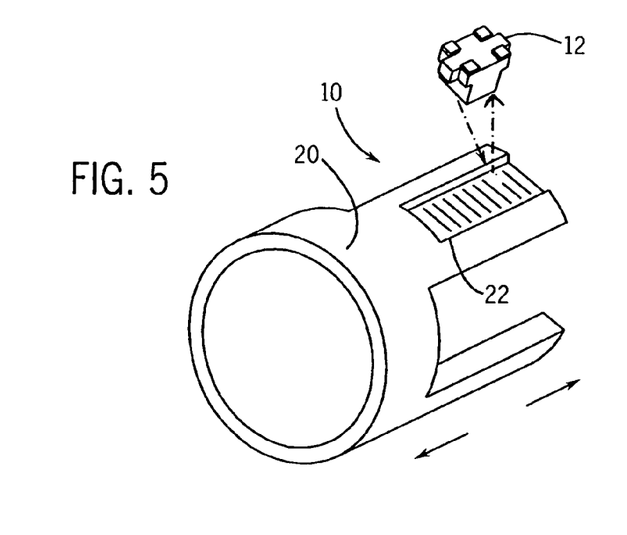
FIG. 5 is a perspective view of a positioning system based on light reflection from a bar code scale constructed in accordance with one embodiment of the present invention.

As shown in FIG. 5, a bar code scale 22 could also be used instead of a greyscale 18 for the purpose of position determination. The position determination is conducted by counting the position sensor signal peaks that the changing light intensity produces. The spacing of the adjacent lines 24 on the bar code scale 22 determines the overall resolution of the position system. Additionally, a wedge-shaped black and white pattern, such as the pattern shown in a top view in FIG. 8, could also be used in place of a greyscale. In this particular embodiment of the invention, the ratio of the black and white areas change along the length of the wedge. Furthermore, the reflection from the reflective target does not need to vary linearly as a function of the position of the target, therefore also non-linear grayscales, grayshade or black and white patterns may be used. A black and white pattern may be any kind of pattern, where the ratio of the black and white areas change when moving along the reflector. Such a pattern, for example, can comprise different sizes of dots, rectangles, or other types of objects whose number, shape or area change as a function of the region of interest of the reflector.

Figure 6:
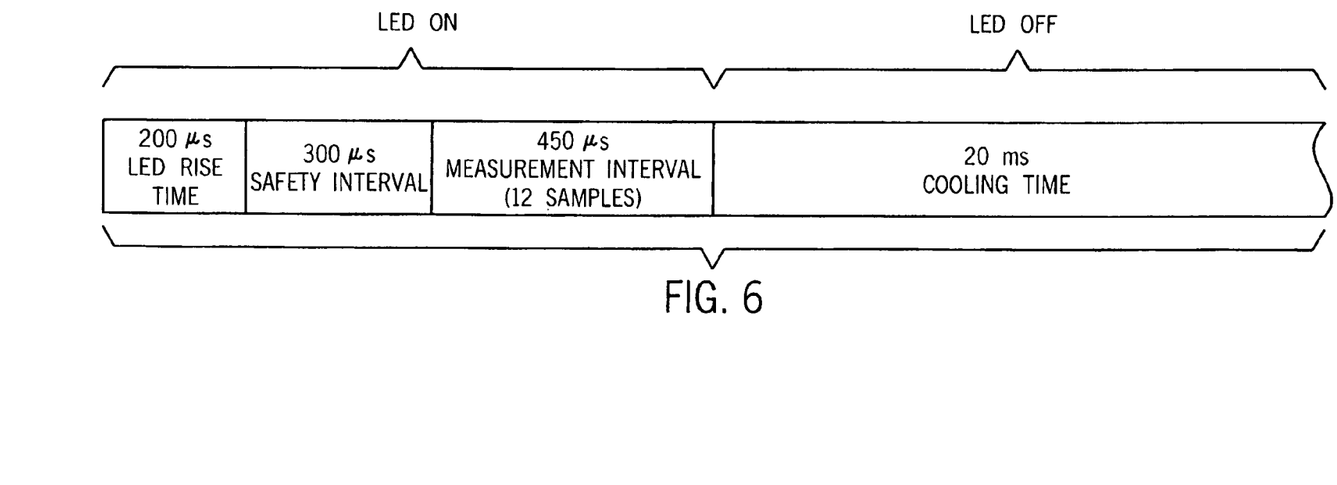
FIG. 6 is a representation showing the principle of pulsed operation of a photointerrupter in accordance with the principles of the present invention.

During the adjustment process, there are principally two different heat sources that can result in inaccuracy—the position sensor 12 itself and the ambient environment. In the case of heat production generated by the position sensor 12 itself, the resulting signal drift can be substantially eliminated or reduced to an insignificant level by minimizing the energy that is supplied to the LED side of the position sensor 12. This is accomplished according to the invention by operating the LED 14 in a pulsed manner. Although this particular embodiment of the invention refers to an LED 14, virtually any type of light source or emitter could be used. According to one embodiment of the present invention, the first part of the operation cycle of the position sensor 12 involves the actual measurement. During this stage, the LED 14 emits light, and the phototransistor 16 measures the reflected light intensity. In one preferred embodiment, the phototransistor 16 collects the data by taking in approximately a dozen samples in a rapid burst, of which a statistical mean value is calculated. The second part of the operation cycle involves the cooling of the position sensor 12. During this stage, the LED 14 is switched off. By repeating this cycle continuously, the drive electronics of the camera module receives the necessary amount of position information. The principle of using a pulsed operation of the photointerruptor 12 is depicted in FIG. 6.

The effect of changing ambient temperature can be taken into account by measuring the temperature of the surrounding environment with a temperature sensor, such as a thermistor, represented at 26 in FIG. 4(*b*), and by feeding this information to the processor. A corrective compensation is made based on the collected ambient temperature information. The thermistor 26 is preferably located in immediate closeness to the position sensor 12.

The present invention can be incorporated into a wide variety of devices and particularly portable electronic devices such as digital cameras and portable telephones or imaging phones. In the case of portable communication devices, the system of the present invention is particularly useful due to the severe spatial constraints that exist in products of this size.

Figure 7A:
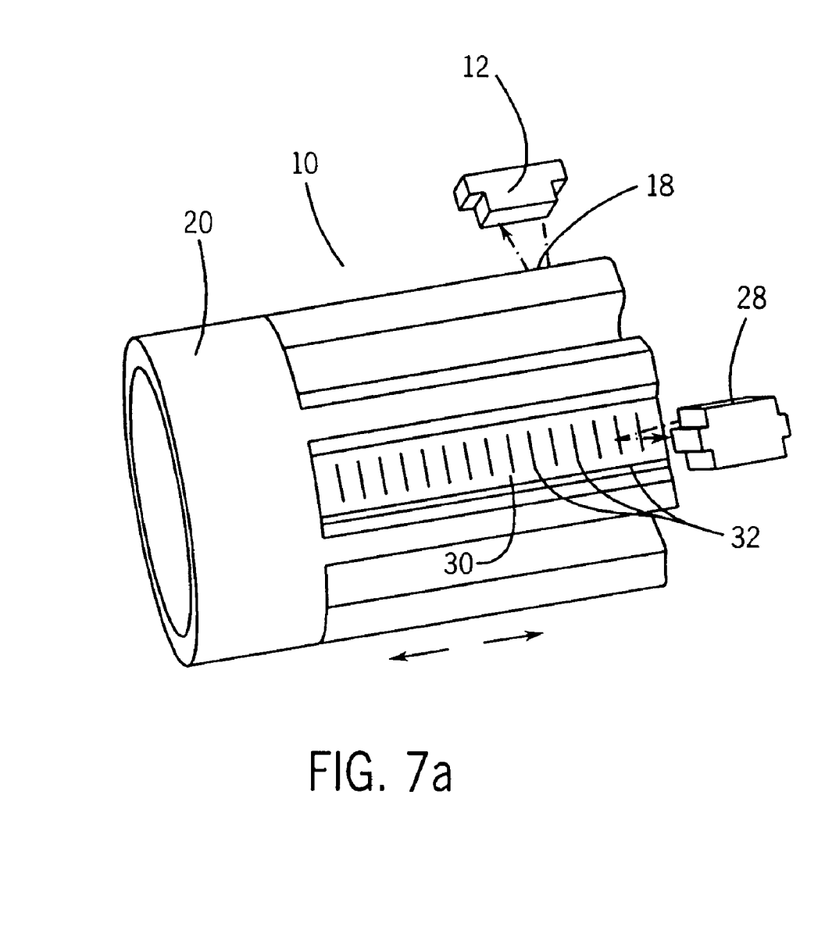

In addition to temperature issues, inaccuracy may also be caused by varying component quality. This is particularly important when the position sensor 12 is basically a conventional proximity sensor component used for a different purpose than for which it was originally intended. In the case of varying component quality, inaccuracies can be corrected or at least substantially reduced by self-calibrating the system. As shown in FIG. 7(*a*), this requires a calibration photointerrupter or sensor 28 which reads a calibration bar code scale 30 made of identical and equally spaced lines 32. The calibration bar code scale 30 is aligned in the same way as the greyscale 18 of FIG. 4(*b*), but is positioned on another fork of the lens frame 20. The spacing between the individual lines 32 is 0.5 mm according to one embodiment of the invention, although other spacings are possible.

Figure 7B:
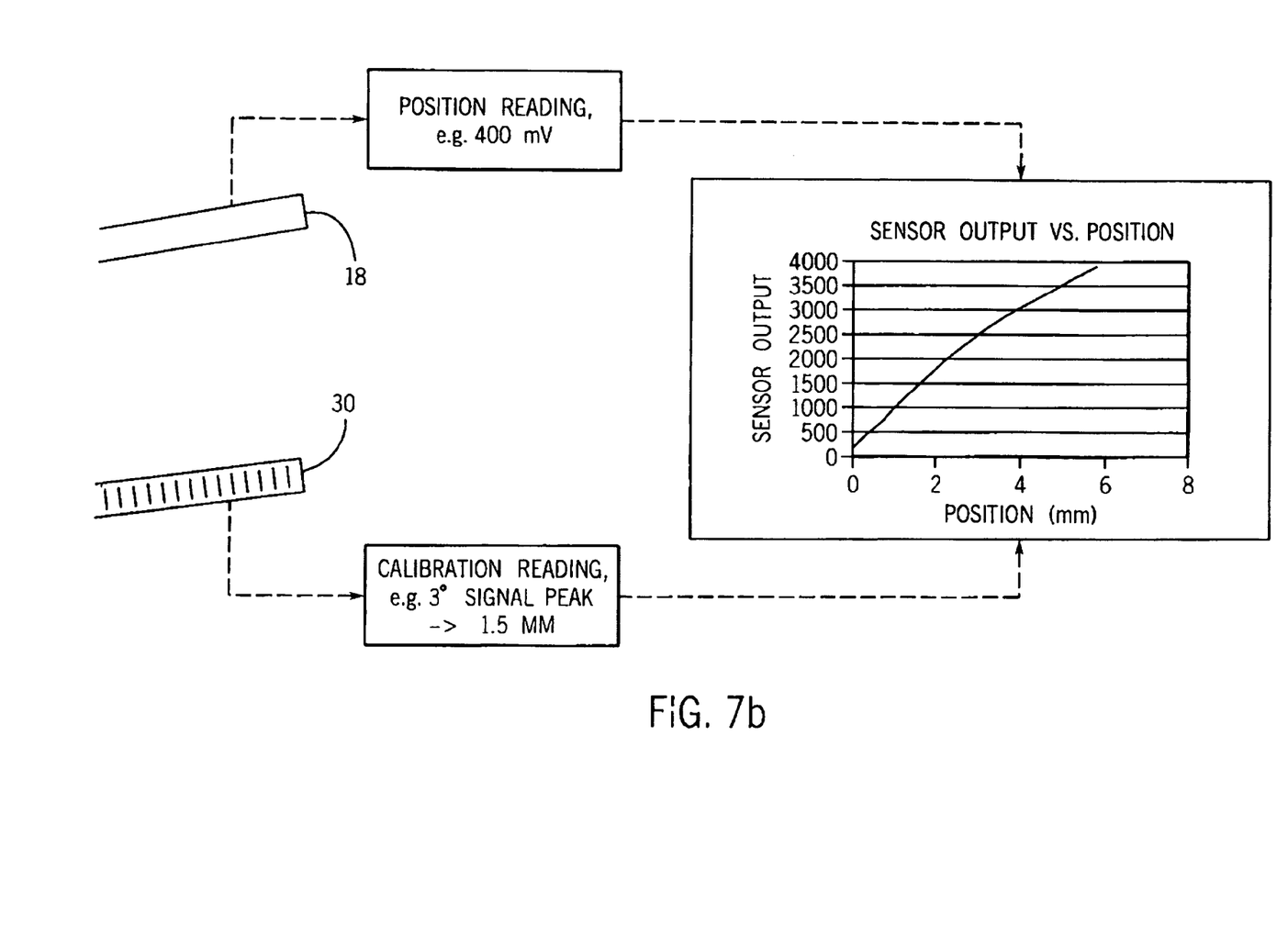
Figure 8:
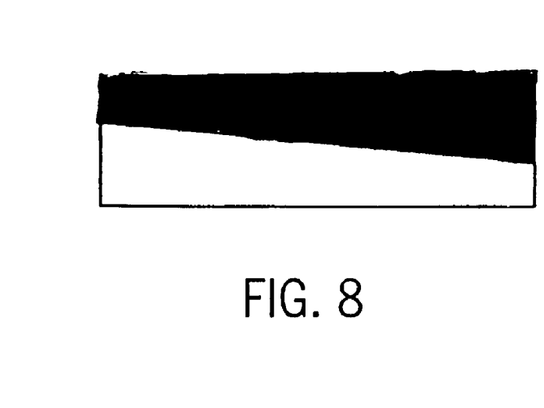
FIG. 8 is a top view of a wedge-shaped black and white pattern that can be used in place of a greyscale according to an alternative embodiment of the present invention.

When the lens tube system 10 requires initializing, particularly during start-up, the calibration sensor 28 reads through the bar code scale 30. The calibration sensor 28 recognizes the individual lines 32 as signal peaks. As the calibration sensor 28 reaches each line 28 (each 0.5 mm interval according to one embodiment of the invention), the grayscale position sensor 12 measures simultaneously the sensor signal that is inducted by the light that reflects from the greyscale 18. This principle of how self-calibration is accomplished is presented in FIG. 7(*b*). Additionally, this self-calibration also prevents the inaccuracy that aging of the LED and long exposures to extreme temperatures may cause.

Figure 9:
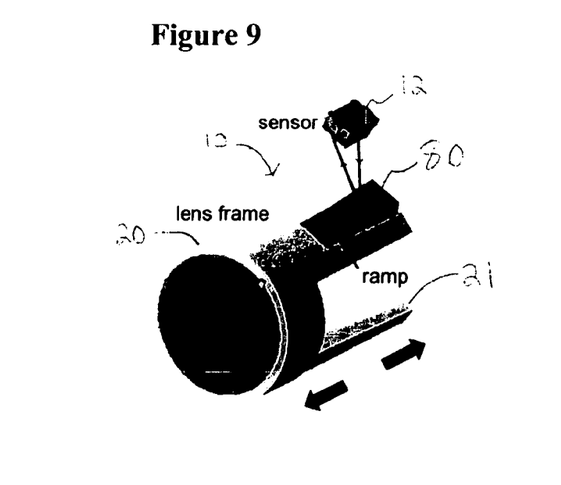
FIG. 9 is a perspective view of a positioning system based upon light reflection from a tilted mono-color reflector constructed in accordance with another embodiment of the present invention.
Figure 10:
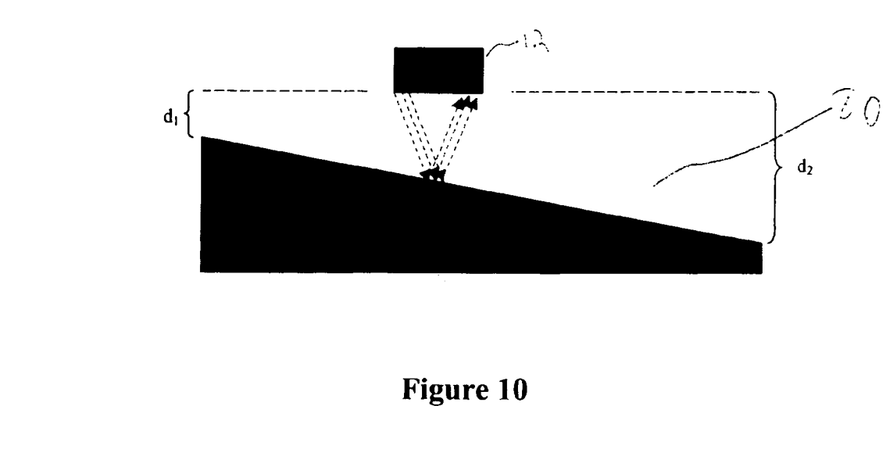
FIG. 10 is a representation showing the interaction between the sensor and the tilted mono-color reflector in the system of FIG. 9.

FIGS. 9-10 show an additional embodiment of the present invention. As is the case with other embodiments discussed herein, the lens tube system 10 of FIG. 9 includes a position sensor 12. The position sensor 12 of FIG. 9 comprises an LED and a phototransistor in one embodiment of the invention. Instead of a greyscale, a bar code scale or any other spatially varying black and white pattern, the system of FIGS. 9 and 10 includes a tilted mono-color reflector 80. As can be observed in FIG. 10, the tilted mono-color reflector 80 varies between a minimum distance $d_1$, from the position sensor 12 and a maximum distance $d_2$ from the position sensor 12. Schematically, the arrangement of the sensor 12 and the tilted mono-color reflector 80 is similar to that shown in FIG. 4(*a*).

The operation of the lens tube system 10 depicted in FIGS. 9-10 is generally as follows. Position determination is based upon measuring the intensity of the light beam that travels from the LED unit on the position sensor 12 to the tilted mono-color reflector 80 and reflects back to the phototransistor or other form of light detector. The output signal of the position sensor 12 depends upon the level of reflectance, which is dependent upon the distance between the position sensor 12 and the tilted mono-color reflector 80.

Figure 11:
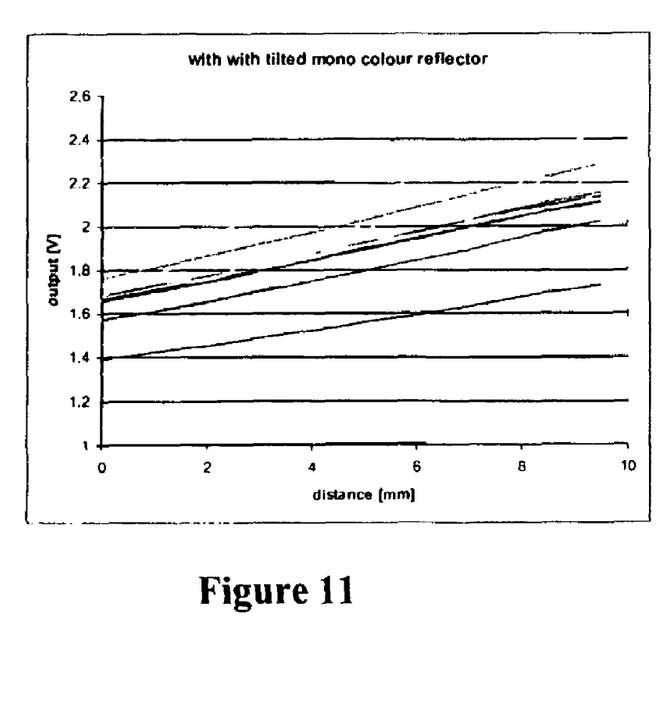
FIG. 11 is a plot showing the output signal as a function of the distance between the reflector and the tilted mono-color reflector in the system of FIG. 9.
Figure 12:
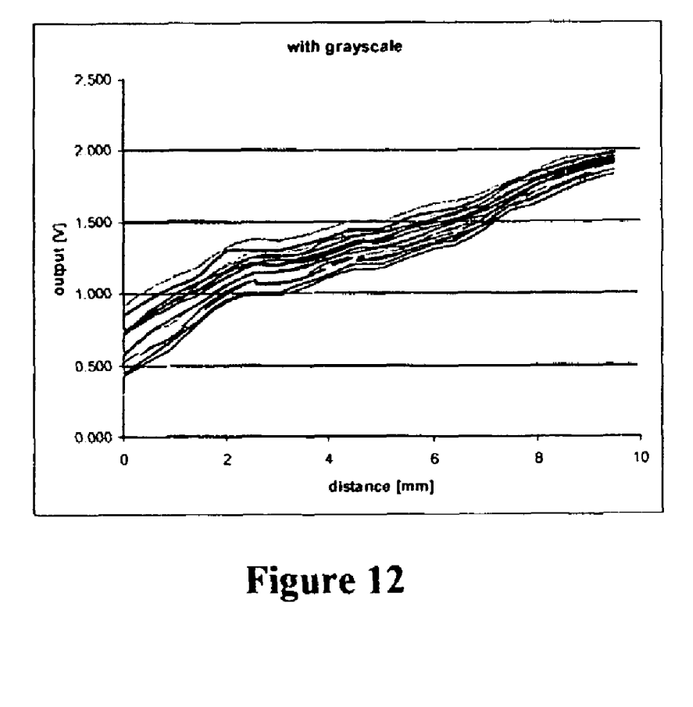
FIG. 12 is a plot showing the output signal as a function of the distance between a sensor and a greyscale reflector in a camera system otherwise similar to the system of FIG. 9.

FIGS. 11 and 12 show the contrast in the consistency of the output signal based upon the use of a tilted mono-color reflector 80 and a greyscale reflector. FIG. 11 shows the output voltage for a position sensor 12 when a tilted mono-color reflector 80 is used. As can be clearly observed, the output voltage is substantially linear based upon the separation distance between the position sensor 12 and the tilted mono-color reflector 80. In contrast, the voltage output is much more erratic when a greyscale reflector is used, as represented in FIG. 12. This difference in linearity shows that the use of a tilted mono-color reflector 80 provides an increased level of accuracy over conventional systems and a greyscale reflector.

The use of a phototransistor and a greyscale, a bar code scale, a black and white pattern or a tilted mono-color reflector in accordance with the principles of the present invention offers a modular, compact and inexpensive solution for micrometer-level positioning. Pulsed position sensor operation also reduces the used energy in the sensor component, which therefore decreases heat production. As a result, minimal sensor signal drift and improved accuracy is achieved. Additionally, ambient temperature compensation with a temperature sensing element such as a thermistor provides uniform sensor performance in all ambient temperatures. Furthermore, self-calibration enables the mass manufacturability of camera modules, due to the fact that no manual tuning is required. Finally, although the effect of aging and exposure to extreme temperatures may tend to distort the sensor output curve, a two sensor system according to the present invention observes these changes and adapts the position system to the changing situation.

While several preferred embodiments have been shown and described, it is understood that changes and modifications can be made to the invention without departing from the invention's broader aspects. For example, items known in the art besides thermistors may be used to measure the ambient temperature, and the light emitting source and light source and light detector do not necessarily have to be part of the same sensor but instead could be physically separated. Additionally, it is also possible that a greyscale (or any other reflector-type surface disclosed above) and a calibration bar code could also be combined into a single reflecting target for use by either one or two separate sensors. Furthermore, it should also be noted that the present invention could be used for both a zoom module, where two lens groups are used and as represented in FIG. 1, as well as for an autofocus system, which may only require a single lens group and as represented in FIG. 4(b). Thus, it is apparent that alternate embodiments are available to those skilled in the relevant art.

What is claimed is:

1. A method for determining the position of a lens system, comprising the steps of:
   providing a lens system including at least one lens and a light reflecting surface, the light reflecting surface being a single, tilted surface of a single color and including a nonuniform height;
   providing a position sensor including at least one light source and a light detector;
   sending an initial signal from the light source to the light reflecting surface, the light reflecting surface reflecting the initial signal to the light detector at a reflection region; and
   generating an electrical output signal based upon the reflected signal from the light source, the electrical output signal providing positioning information for the lens system, wherein intensity of the reflected signal is weakened as the reflection region moves farther from the position sensor, and wherein, as the lens moves relative the position sensor, the electrical output signal is altered based upon the position of the reflection region as the reflection region moves relative the position sensor.

2. The method of claim 1, wherein the light source comprises a light emitting semiconductor component.

3. The method of claim 1, further comprising:
   measuring ambient temperature in the vicinity of the position sensor; and
   using information concerning the ambient temperature to aid in the determination of the position of the lens system.

4. The method of claim 1, further comprising:
   using a calibration sensor to measure the relative position of the lens system relative a calibration scale; and
   using information generated from the calibration sensor to calibrate the position of the lens system.

5. The method of claim 4, wherein the calibration scale comprises a bar code scale operatively connected to the lens.

6. The method of claim 1, wherein the positioning information is related to the position of the lens system relative to a frame.

7. The method of claim 1, wherein the positioning information is related to the position of the lens system relative to a second lens system.

8. An optical lens system, comprising:
   a lens frame;
   a lens operatively coupled to the lens frame;
   a mono-color light reflective surface being a single, tilted surface and being operatively coupled to the lens frame; and
   a position sensor located relative the mono-color light reflective surface so as to enable signal communication therebetween,
   wherein the position sensor generates a signal that is transmitted to the mono-color light reflective surface at a reflection region and back to the position sensor, and wherein information gathered by the position sensor based upon the reflected signal is dependent upon the distance between the reflection region and the position sensor.

9. The optical lens system of claim 8, wherein the position sensor comprises:
   a light source, and
   a light detector.

10. The optical lens system of claim 9, wherein the light source comprises a light emitting semiconductor component.

11. The optical lens system of claim 8, wherein the light emitting semiconductor component is alternately activated and deactivated to minimize the amount of heat generated by the position sensor.

12. The optical lens system of claim 8, wherein the information gathered by the position sensor is related to the position of the lens relative to a system frame.

13. The optical lens system of claim 8, wherein the information gathered by the position sensor is related to the position of the lens relative to a second lens.

14. The optical lens system of claim 8, further comprising:
   a calibration scale operatively connected to the lens frame; and
   a calibration sensor located relative the calibration scale so as to enable signal communication therebetween,
   wherein the calibration sensor sends a signal to the calibration scale which is reflected back to the calibration sensor, and wherein information regarding the reflected signal is used to calibrate the relative position of the lens.

15. The optical lens system of claim 8, further comprising a thermistor positioned in the vicinity of the position sensor, the thermistor providing information regarding the ambient temperature in order to aid in the determination of the relative position of the lens.

16. A portable electronic device, comprising:
a housing; and
an optical lens system operatively connected to the housing, the optical lens system including:
  a lens frame;
  a lens operatively coupled to the lens frame;
  a single, wedge-shaped, mono-color light reflective surface operatively coupled to the lens frame; and
  a position sensor located relative the mono-color light reflective surface so as to enable signal communication therebetween,
wherein the position sensor generates a signal that is transmitted to the mono-color light reflective surface at a reflection region and back to the position sensor, and wherein the generated signal is dependent upon the distance between the reflection region and the position sensor.

17. The portable electronic device of claim 16, wherein the position sensor comprises:
a light source; and
a light detector.

18. A sensor module for determining the position of an object, comprising:
  a single, tilted, mono-color light reflective surface operatively coupled to a lens frame; and
  a position sensor located relative the mono-color light reflective surface so as to enable signal communication therebetween and including:
    a light source; and
    a light detector,
wherein the light source generates a signal that is transmitted to the mono-color light reflective surface at a reflection region and reflected to the light detector, and wherein the height of the reflection region relative to the position sensor affects information generated by the position sensor as a result of the reflected signal.

19. A portable electronic device, comprising:
a housing; and
a sensor module for determining the position of an object, including:
  a single, tilted, mono-color light reflective surface operatively coupled to a lens frame, the mono-color light reflective surface having a nonuniform height; and
  a position sensor located relative the mono-color light reflective surface so as to enable signal communication therebetween and including a light source and a light detector,
wherein the light source generates a signal that is transmitted to the single, tilted, mono-color light reflective surface at a reflection region and reflected to the light detector, and wherein the generated signal is dependent upon the location of the reflection region, such that intensity of the generated signal when reflected is weakened as the reflection region moves farther from the position sensor.

\* \* \* \* \*